(12) United States Patent
Waibel et al.

(10) Patent No.: US 8,204,739 B2
(45) Date of Patent: *Jun. 19, 2012

(54) SYSTEM AND METHODS FOR MAINTAINING SPEECH-TO-SPEECH TRANSLATION IN THE FIELD

(75) Inventors: Alexander Waibel, Murrysville, PA (US); Ian R. Lane, Pittsburgh, PA (US)

(73) Assignee: Mobile Technologies, LLC, Murrysville, PA (US)

( * ) Notice: Subject to any disclaimer, the term of this patent is extended or adjusted under 35 U.S.C. 154(b) by 201 days.

This patent is subject to a terminal disclaimer.

(21) Appl. No.: 12/424,311

(22) Filed: Apr. 15, 2009

(65) Prior Publication Data

US 2009/0281789 A1 Nov. 12, 2009

Related U.S. Application Data

(60) Provisional application No. 61/045,079, filed on Apr. 15, 2008, provisional application No. 61/092,581, filed on Aug. 28, 2008, provisional application No. 61/093,898, filed on Sep. 3, 2008.

(51) Int. Cl.
*G06F 17/21* (2006.01)

(52) U.S. Cl. ........... 704/10; 704/2; 704/5; 704/6; 704/7; 704/9

(58) Field of Classification Search ................... None
See application file for complete search history.

(56) References Cited

U.S. PATENT DOCUMENTS

| | | | |
|---|---|---|---|
| 5,855,000 A | | 12/1998 | Waibel et al. |
| 6,223,150 B1 * | | 4/2001 | Duan et al. ............... 704/9 |
| 6,278,968 B1 * | | 8/2001 | Franz et al. ............... 704/3 |
| 6,282,504 B1 * | | 8/2001 | Wong et al. ............... 703/21 |
| 6,356,865 B1 * | | 3/2002 | Franz et al. ............... 704/2 |
| 6,374,224 B1 * | | 4/2002 | Horiguchi et al. ......... 704/266 |
| 6,442,524 B1 * | | 8/2002 | Ecker et al. ............... 704/277 |
| 2002/0198713 A1 * | | 12/2002 | Franz et al. ............... 704/252 |
| 2007/0016401 A1 * | | 1/2007 | Ehsani et al. ............... 704/9 |
| 2007/0179779 A1 * | | 8/2007 | Kagoshima et al. ........... 704/10 |

OTHER PUBLICATIONS

Brown et al., The Mathmatics of Statistical Machine Translation: Parameter Estimation, Association for Computational Linguistics, 1993.

Chiang et al., The Hiero Machine Translation System: Extensions, Evaluation, and Analysis, Proceedings of Human Language Technology Conference on Empirical Methods in Natural Language Processing, pp. 779-786, Oct. 2005.

Knight et al., Machine Transliteration, Association for Computational Linguistics, 1998.

(Continued)

*Primary Examiner* — Leonard Saint Cyr

(74) *Attorney, Agent, or Firm* — K&L Gates LLP

(57) ABSTRACT

A method and apparatus are provided for updating the vocabulary of a speech translation system for translating a first language into a second language including written and spoken words. The method includes adding a new word in the first language to a first recognition lexicon of the first language and associating a description with the new word, wherein the description contains pronunciation and word class information. The new word and description are then updated in a first machine translation module associated with the first language. The first machine translation module contains a first tagging module, a first translation model and a first language module, and is configured to translate the new word to a corresponding translated word in the second language. Optionally, the invention may be used for bidirectional or multi-directional translation.

31 Claims, 11 Drawing Sheets

OTHER PUBLICATIONS

Koehn et al., Moses: Open Source Toolkit for Statistical Machine Translation, Proceedings of the ACL 2007 Demo and Poster Seesions, pp. 177-180, Prague, Jun. 2007.

Lafferty et al., Conditional Random Fiels: Probabilistic Models for Segmenting and Labeling Sequence Data, http://www.cis.upenn.edu~pereira/papers/crf.pdf, 2001.

Metze et al. The Nespole! Speech-To-Speech Translation System, Proceeding of HLT 2002, Second International Conference on Human Language Technology Research, San Francisco, 2002.

Och et al., A Systematic Comparison of Various Statisitical Alignment Methods, Association for Computational Linguistics, 2003.

Och et al., Improved Alignment Models for Statistical Machine Translation, http://www.aclweb.org/anthology-new/W/W99-0604.pdf, 1999.

Papineni et al., Bleu: A Method for Automatic Evaluation of Machine Translation, Proceedings of the 40th Annual Meeting of the Association for Computational Linguistics, pp. 311-318, Jul. 2002.

Stolcke, Andreas, Srilm-An Extensible Language Modeling Toolkit, http://www.speech.sri.com/cgi-bin/run-distill?papers/icslp2002-srilm.ps.gz, 2002.

Suhm et al., Towards Better Language Models for Spontaneous Speech, Carnegie Mellon University, (1994) (4 pages).

Yamada et al., A Decoder for Syntax-Based Statistical MT, Proceedings of the 40th Annual Meeting of the Association for Computational Linguistics, Jul. 2002, pp. 303-310.

Yarwsky et al. Inducing Multilingual Text Analysis Tools Via Robust Projections Across Algined Corpora, http://delivery.acm.org.10.1145.1080000/1072187/p35-yarowsky.pdf., (2001).

Arbabi et al., Algorrithms for Arabic Name Tansliteration, IBM J. Res. Develop. vol. 38 No. 2 Mar. 1994.

Zhao et al., A Log-Linear Block Transliteration Model Based on Bi-Stream HMMS, Proceedings of NAACL HLT (2007) pp. 364-371.

Koehn et al., Open Source Toolkit for Statistical Machine Translation: Factored Translation Models and Confusion Network Decoding, Sep. 2007 (102 pages).

Okuma, Hideo et al., "Introducing Translation Dictionary Into Phrase-based SMT," Proc. Machine Translation Summit XI, Sep. 10, 2007-Sep. 14, 2007, pp. 361-368, http://www.mt-archive.info/MTS-2007-Okuma.pdf.

Narayanan, S. et al., "Transonics: A Speech to Speech System for English-Persian Interactions," Automatic Speech Recognition and Understanding, 2003. ASRU 2003. 2003 I EE Workshop on St. Thomas, VI, USA, Nov. 30-Dec. 3, 2003. Piscataway, NJ, USA, IEEE, Nov. 30, 2003, pp. 670-675.

Lane, Ian R. et al., "Class-based Statistical Machine Translation for Field Maintainable Speech-to-Speech Translation," Interspeech, Sep. 22, 2008, pp. 2362-2365, http://isl.ira.uka.de/fileadmin/publication-files/851_ISO81131.pdf.

* cited by examiner a) example of visual interface [13] to display automatically generated word information
(step 80, Figure 6)  User adds English word "Wheeling" (City name)

b) example of visual interface [13] to display automatically generated word information
(step 80, Figure 6)  User adds Japanese word "ワカヤマ" (City name)

Monolingual feature set for word $\underline{w}_{a,i}$ = { $\underline{w}_{a,i}$ , stem($\underline{w}_{a,i}$) , $\underline{w}_{a,i-2}$ , $\underline{w}_{a,i-1}$ , $\underline{w}_{a,i+1}$ , $\underline{w}_{a,i+2}$ }

Bilingual feature set for word $\underline{w}_{a,i}$ = { $\underline{w}_{a,i}$ , stem($\underline{w}_{a,i}$) , $\underline{w}_{a,i-2}$ , $\underline{w}_{a,i-1}$ , $\underline{w}_{a,i+1}$ , $\underline{w}_{a,i+2}$ , $\underline{w}_{b,j}$ }

SYSTEM AND METHODS FOR MAINTAINING SPEECH-TO-SPEECH TRANSLATION IN THE FIELD

CROSS REFERENCE TO RELATED APPLICATIONS

The present application claims priority to U.S. Provisional Patent Application No. 61/045,079 filed on Apr. 15, 2008; U.S. Provisional Application No. 61/092,581 filed on Aug. 28, 2008; and U.S. Provisional Patent Application No. 61/093,898 filed on Sep. 3, 2008.

BACKGROUND OF THE INVENTION

1. Field of the Invention

The present invention is directed generally to speech-to-speech translation systems for cross-lingual communication, and more particularly, to a method and apparatus for field maintenance that enables users to add new vocabulary items and to improve and modify the content and usage of their system in the field, without requiring linguistic or technical knowledge or expertise.

2. Description of the Invention Background

Automatic speech recognition (ASR) and machine translation (MT) technologies have matured to the point where it has become feasible to develop practical speech translation systems on laptops or mobile devices for limited and unlimited domains. Domain limited speech-to-speech systems, in particular, have been developed in the research field and in research laboratories for a variety of application domains, including tourism, medical deployment and for military applications. Such systems have been seen before in the works of A. Waibel, C. Fugen, "Spoken language translation" in Signal Processing Magazine, IEEE May 2008; 25(3):70-79, In Proc. HLT, 2003; and Nguyen Bach, Matthias Eck, Paisarn Charoenpornsawat, Thilo Köhler, Sebastian Stüker, ThuyLinh Nguyen, Roger Hsiao, Alex Waibel, Stephan Vogel, Tanja Schultz and Alan W. Black, for examples. "The CMU TransTac 2007 eyes-free and hands-free two-way speech-to-speech translation system," In Proc. of the IWSLT, Trento, Italy, October 2007. They are limited, however, in that they operate with a limited vocabulary which is defined by the developers of the system in advance, and is determined by the application domain, and the location where it is envisioned the system will be used. Thus vocabularies and language usage are determined largely based on example scenarios and by data that is collected or presumed in such scenarios.

In field situations, however, actual words and language usage deviate from the anticipated scenario of the laboratory. Even in simple domains such as tourism language usage will vary dramatically in the field as a user travels to different locations, interacts with different people and pursues different goals and needs. Thus, new words and new expressions will always arise. Such new words—in speech recognition parlance "out-of-vocabulary" (OOV) words will be misrecognized as an in-vocabulary word and then translated incorrectly. The user may attempt a paraphrase, but if a critical word or concept (such as a person or a city name) cannot be entered or communicated, the absence of the word or expression may lead to communication break-down.

Despite the need for user modifiable speech-to-speech translation systems, an actual solution has so far not been proposed. While adding a word to the system may seem to be easy, making such modifications proves to be extraordinarily difficult. Appropriate modifications must be made to many component modules throughout the entire system, and most modules would have to be retrained to restore the balance and integrated functioning of the components. Indeed, about 20 different modules would have to be modified or re-optimized to learn a new word. Such modifications require expertise and experience with the components of a speech translation system, and as a result, to the inventor's understanding, such modifications have so far been done only in the laboratory by experts, requiring human expertise, time and cost.

For example, if a system designed for users in Europe does not contain the name "Hong Kong" in the vocabulary. Once a speaker speaks the sentence "Let's go to Hong Kong", the system will recognize the closest sounding similar word in the dictionary and produce: "Let's go to home call". At this point it is not obvious if the error was the result of a recognition error or result of the absence of this word in the entire speech-to-speech translation system. The user therefore proceeds to correct the system. This can be done by one of several correction techniques. The simplest might be re-spealcing or typing, but it can alternatively be done more effectively by cross-modal error correction techniques as described by other disclosures and prior art (Waibel, et al., U.S. Pat. No. 5,855, 000). Once the correct spelling of the desired word sequence has been established ("Let's go to Hong Kong"), the system performs a translation. If "Hong Kong" is in the dictionary, the system would proceed from there normally, performing translation and synthesis. If, however, it is absent from the recognition and translation dictionary, the system would need to establish if this word is a named entity or not. Finally, and most importantly, even if a name or word can be translated properly to the output languages by user intervention, without learning it, the system would fail again when the user speaks the same word the next time around.

Unfortunately, learning a new word cannot be addressed just by simply typing in a new word in a word list, but it requires changes at about 20 different points and at all levels of a speech translation system. Presently it also involves manual tagging and editing of entries, collection of extensive databases involving the required word, retraining of language model and translation model probabilities and re-optimization of the entire system, so as to re-establish the consistency between all the components and components' dictionaries and to restore the statistical balance between the words, phrases and concepts in the system (probabilities have to add up to 1, and thus all words would be affected by a single word addition).

As a result, even small modifications of existing speech translation systems have generally required use of advanced computing tools and linguistic resources found in research labs. For actual field use, however, it is unacceptable to require every modification to be done at the lab, since it takes too much time, effort and cost. Instead, a learning and customization module is needed that hides all the complexity from the user, and performs all the critical operations and language processing steps semi-autonomously or autonomously behind the scenes, and interacts with the human user in the least disruptive manner possible by way of a simple intuitive interface, thereby eliminating the need for linguistic or technical expertise in the field altogether. In the present invention, we provide a detailed description for a learning and customization module that satisfies these needs.

Unfortunately, translation systems are often prohibitively complex such that access for users is not practicable or used. Thus, there is a need for systems and methods that use machine translation techniques and enable user modification capabilities to provide cross-lingual communication without requiring linguistic or technical knowledge or expertise, making it possible to overcome language barriers and bring people closer together.

SUMMARY OF THE INVENTION

In various embodiments, the present invention solves the foregoing problems by providing a method and apparatus for updating the vocabulary of a speech translation system. In various embodiments a method is provided for updating the vocabulary of a speech translation system for translating a first language into a second language including written and spoken words. The method includes adding a new word in the first language to a first recognition lexicon of the first language and associating a description with the new word, wherein the description contains pronunciation and word class information. The new word and description are then updated in a first machine translation module associated with the first language. The first machine translation module contains a first tagging module, a first translation model and a first language module, and is configured to translate the new word to a corresponding translated word in the second language.

Optionally, for bidirectional translation, the method additionally includes the steps of translating the translated word from the second language back into the new word of the first language, correlating the new word with a corresponding translated word of the second language and adding the translated word and its description to a second recognition lexicon of the second language. A second machine translation module associated with the second language is then updated with the translated word and the description. The second machine translation module contains a second tagging module, a second translation model and a second language module In embodiments the method further comprises the further step of inputting the first word into a text-to-speech pronunciation lexicon associated with the first language, and inputting the second word into a text-to-speech pronunciation lexicon associated with the second language. The input signals may be of different modalities (e.g. speech and nonverbal spelling, speech and verbal spelling, writing and speech, etc.) (referred to herein as "cross-modal") or may be of the same modality (speech and respeaking, writing and rewriting, etc.).

An embodiment of the invention is directed to a field maintainable class-based speech-to-speech translation system for communicating between a first language and a second language. The system includes two speech recognition units, each configured for accepting sound comprising the spoken word of the first or second language and for producing text that corresponds to the spoken language, and two corresponding machine translation units, each configured to receive text from one of the speech recognition units and output a translation of the text into text of the other language. It also includes a user field customization module that enables the system to learn new words in cooperation with the user. The user field customization module is configured for accepting user selected input that comprises sounds or text corresponding to one or both of the languages and updates the machine translation units appropriately with the user selected input.

In an embodiment, four primary features equip the system to provide a field maintainable class-based speech-to-speech translation system. The first includes a speech translation framework that enables the addition of new words to the active system vocabulary, or the switching between location or task specific vocabularies. This provides for dynamic addition of words to a speech recognition module without requiring the module to be re-started. The system uses multilingual system-dictionary and language independent word-classes across all system components in the speech-to-speech translation device, class-based machine-translation (phrase-based statistical MT, syntactic, example-based, etc), multilingual word-class tagging during model training, based on combination of monolingual taggers, and word-class tagging in new language by way of alignment via parallel corpus from known tagged language. Second, a multimodal interactive interface enables non-experts to add new words to the system. Third, the system is designed to accommodate ASR and SMT model adaptation using multimodal feedback provided by the user. And fourth, the system has networking capability to enable sharing of corrections or words.

In another embodiment, a multimodal interactive interface enabling a user to add new words to a speech-to-speech translation device in the field and without technical expertise is disclosed. Examples include: (1) Methods to automatically classify class of word or word-phrase to be added to the system, and automatically generate of pronunciations, and translation of the word; (2) Method for entering new words cross-modally by one or more of speaking, typing, spelling, handwriting, browsing, paraphrasing; (3) Multimodal feedback to help a linguistically untrained user determine if phonetic transliteration and translation is adequate: multiple textual forms (i.e. Romanized form as well as written form in other language's script) and acoustic form via text-to-speech (TTS; i.e. does it sound right); (4) Method for setting language model and translation probabilities for new word; and (5) Boosting or discounting language model and translation probabilities for new learned word based on relevance to user activities, interests and history of use.

In another embodiment, an online system that corrects via multimodal user feedback in the field is disclosed. Examples include: (1) Interface and methods to enable users to correct automatic speech recognition results, and use of this feedback information to adapt speech recognition components; (2) Interface and methods to enable users to correct machine translation hypotheses, and use of this feedback information to improve machine translation components; and (3) Method for automatically adjusting (enhancing or decreasing) language model, dictionary and translation model probability for correct or corrected word based on user correction.

In another embodiment, an internet application that allows users to share corrections or new word additions done in the field across devices is disclosed. Examples include: (1) Methods to upload, download and edit models for use in speech-to-speech translation devices via the world-wide-web; (2) Methods to collate in-the-field new words additions and corrections across the entire community of users; and (3) Methods to upload, download and edit, location or task specific vocabularies for use in speech-to-speech translation devices.

BRIEF DESCRIPTION OF THE FIGURES

The accompanying drawings illustrate examples of embodiments of the present invention. In such drawings.

DETAILED DESCRIPTION

Various embodiments of the present invention describe methods and systems for speech-to-speech translation. Embodiments may be used to adapt to the user's voice and speaking style via model adaptation. In further embodiments, the user can correct recognition errors and the system can explicitly learn from errors that the user corrected, thereby making it less likely that these errors occur again in the future. The present invention enables the user to customize the vocabulary to his or her individual needs and environment by either adding new words to the system, or selecting predefined dictionaries that are optimized for a specific location or task. When adding new words a multimodal interface allows the user to correct and verify automatically generated translations and pronunciations. This allows the user to add new words to the system when the user has no knowledge of the other language. In an embodiment, the system is further configured to transmit any new vocabulary inputted by a user to a community of users. This data is collated and dictionaries are automatically generated which can then be downloaded by any user.

Figure 1:
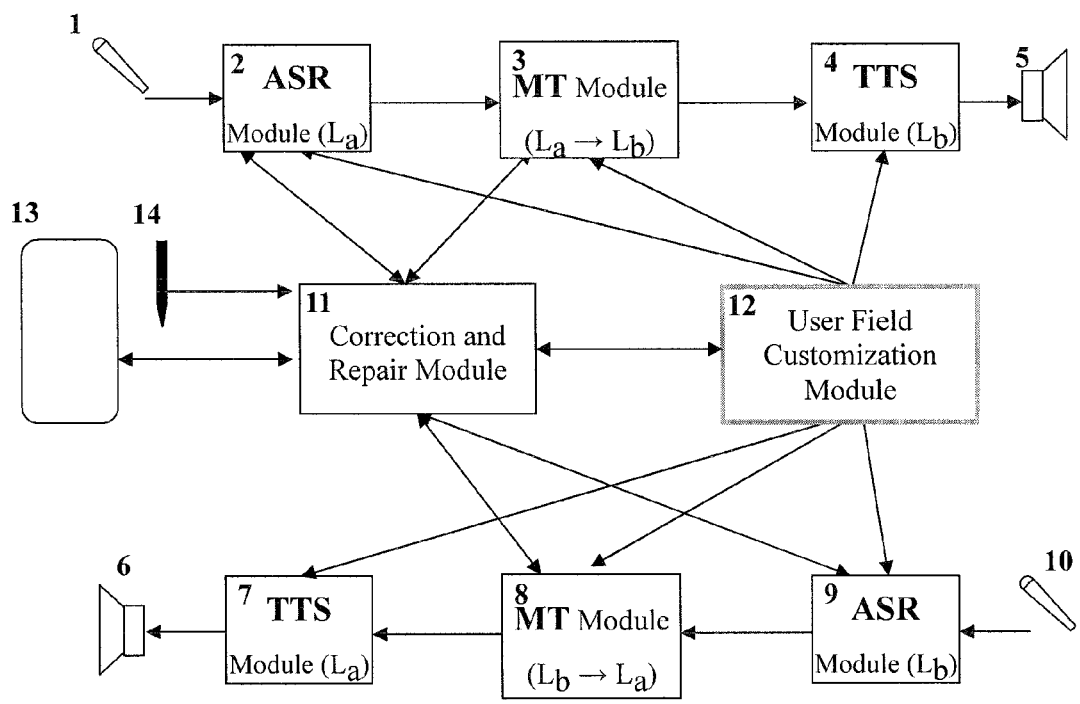
FIG. 1 is a block diagram illustrating a speech-to-speech translation system constructed according to an embodiment of the present invention.

FIG. 1 illustrates a block diagram overview of an example of a field maintainable speech-to-speech translation system according to the present invention. In this example the system operates between two languages $L_a$ and $L_b$. This is the typical implementation of a speech-to-speech dialog system involving speech-to-speech translation in both directions, from $L_a$ to $L_b$ and from $L_b$ to $L_a$. However, the bi-directionality of this configuration is not a prerequisite for the present disclosure. A uni-directional system from $L_a$ to $L_b$, or a multi-directional system involving several languages $L_1 \ldots L_n$ could equally benefit from the present invention. The system has two ASR modules 2 and 9, that recognize speech for $L_a$ and $L_b$, respectively, and produce text corresponding to $L_a$ and $L_b$, respectively using acoustic model 18, ASR class-based language model 19 and a recognition lexicon model 20 (shown in FIG. 3). In this example, we used the "Niija" speech recognizer system developed at Mobile Technologies, LLC. Other types of ASR modules which may be used include speech recognizers developed by IBM Corporation, SRI, BBN or at Cambridge or Aachen.

The system also includes two machine translation modules 3 and 8, which translate text from $L_a$ to $L_b$ and from $L_b$ to $L_a$, respectively (module 11). The MT module used in this example was the "PanDoRA" system developed at Mobile Technologies, LLC. Other MT modules could be used such as those developed by IBM Corporation, SRI, BBN or at Aachen university.

Two text-to-speech engines, 4 and 7 each corresponding to one of the machine translation modules 3 and 8, are configured to receive text produced from a corresponding ASR unit. The output text is transferred to the respective MT module, 3 or 8, that translate text from $L_a$ to $L_b$ and from $L_b$ to $L_a$, respectively. The TTS module generates audio output to convert at least one text word in $L_a$ to speech via an output device 5, such as a loud speaker, and at least one text word in $L_b$ to speech via device 5 or another output device, such as a loud speaker 6, respectively. For this example a Cepstral TTS module was used. Any TTS modules which support Windows SAPI (speech application programming interface) conventions could also be employed.

A correction and repair module 11 allows the user to correct the system output via multiple modalities; including speech, gesture, writing, tactile, touch-sensitive and keyboard interfaces, and enables the system to learn from the user's corrections. The correction and repair module may be of the type such as that disclosed in U.S. Pat. No. 5,855,000. A user field customization module 12, provides an interface for users to add new vocabulary to the system, and can also select an appropriate system vocabulary for their current situation. For example, triggered by a change in location, as determined by the GPS coordinates indicating the current location of the device, or an explicit selection of task or location by the user.

Figure 2:
FIG. 2 illustrates an example of a graphical user interface that is displayed to user via a tablet interface.

The user can access the user field customization module 12 and interact with the system via a graphical user interface displayed on the screen (or active touch screen) of the device 13, and a pointing device 14, including a mouse or pen. An example of a graphical user interface is shown in FIG. 2. In this example, the device 13 displays the text of audio input of a $L_a$ and corresponding text in window 15. Machine translation of text $L_a$ in the second language $L_b$ is displayed in window 16.

In an embodiment, the same microphone and loud-speaker can be used for both languages. Thus, microphones 1 and 10 can be a single physical device, and speakers 5 and 6 can be a single physical device.

Figure 3:
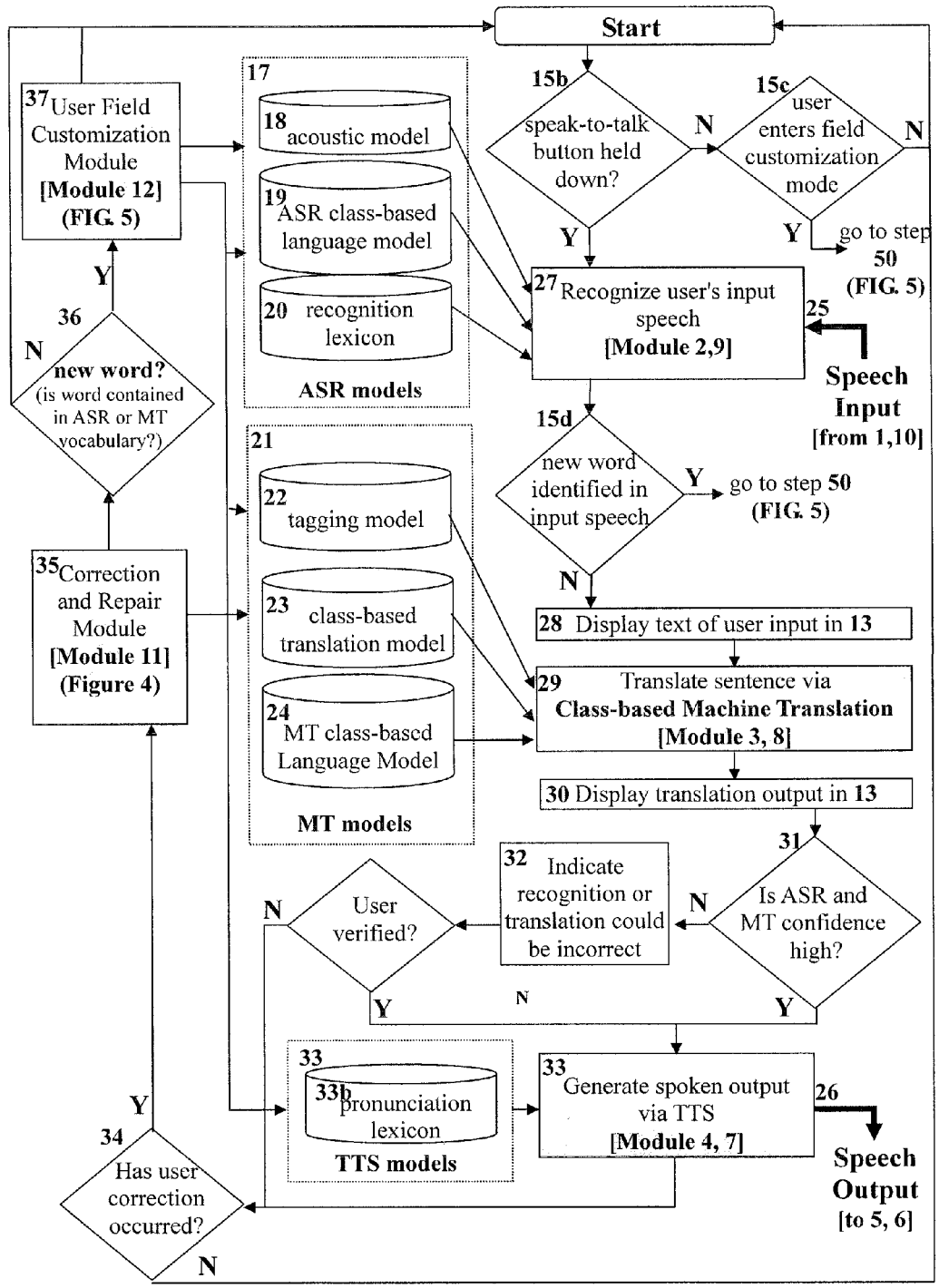
FIG. 3 is a flow chart illustrating the steps of speech-to-speech translation performed according to an embodiment of the present invention in FIG. 1.

A flow chart illustrating the operation of an example of the method of the present invention is shown in FIG. 3. First, the speech recognition system is activated by the user at step 15b. For instance, a button can be selected on the graphical user interface (FIG. 2, item 15b) or on an external physical button (not shown). The user's speech (item 25) is then recognized by one of the ASR modules in step 27; module 2, if the user is speaking $L_a$, and module 9 if the user is speaking $L_b$. The ASR modules 2 and 9 apply three models: acoustic model 18, ASR class-based language model 19 and a recognition lexicon model 20. These models are language specific and each ASR module contains its own set of models. The resulting text of the user's speech is displayed via the GUI on the device screen 13 at step 28.

Translation is then applied via MT module 3 or 8 based on the input language (step 29). MT modules 3 and 8, apply three main models: a tagging or parsing [Collins02] model to identify word classes (model 22), a class-based translation model (model 23), and a class-based language model (model 24). The tagging model 22 may be any suitable type of tagging or parsing model such as the types described in J. Lafferty, A. McCallum, and F. Pereira, "Conditional random fields: Probabilistic models for segmenting and labeling sequence data," In Proceedings of 18th International Conference on Machine Learning, pages 282-289, 2001 ("Lafferty01") or Michael Collins, "Parameter estimation for statistical parsing models: Theory and practice of distribution-free methods" (2004) In Harry Bunt, John Carroll, and Giorgio Satta, editors, New Developments in Parsing Technology, Kluwer. Other models that are applied during the machine translation include distortion models, which constrain how words are re-ordered during translation, and sentence length models. A detailed description of class-based machine translation is given below. The resulting translation is displayed via the GUI on device 13 as shown in step 30.

To help the user determine if the translation output is adequate, the automatically generated translation (FIG. 2, item 16) is translated back into the input language via MT module 3 or 8 and displayed with parentheses under the original input as illustrated for example in FIG. 2, item 15*a*. If the confidence of both speech recognition and translation are high (step 31) as determined by the ASR model, 2 or 9, and the MT module, 3 or 8, spoken output (item 26) is generated via loud speakers 5 or 6, via TTS modules 4 or 7 (step 33). Otherwise, the system indicates that the translation may be wrong via the GUI, audio and/or tactical feedback. The specific TTS module used in step 33 is selected based on the output language.

Thereafter, if the user is dissatisfied with the generated translation, the user may intervene during the speech-to-speech translation process in any of steps from 27 to 33 or after process has completed. This invokes the Correction and Repair Module module 11 at (step 35). The correction and repair module 11 records and logs any corrections the user may make, which can be later used to update ASR modules 2 and 9 and MT modules 3 and 8 as described in detail further below in this document. If the correction contains a new vocabulary item (step 36), or if the user enters the field customization mode to explicitly add a new word to the system in step 15*c*, or if a new word is automatically detected in the input audio using confidence measures or new word models, such as the method described in Thomas Schaaf, "Detection of OOV words using generalized word models and a semantic class language model," in Proc. of Eurospeech, 2001 in step 15*d*; the User Field Customization Module 12 is invoked. This module 12 provides a multimodal interface to enable users to add new words to the active system vocabulary. When a new word or phrase is added by a user the ASR, MT and TTS models (items 17, 21 and 33*a*) are updated as required. The functioning of this module is described further below for both languages.

A common set of classes (for example person names, place names, and organization names) is used in both ASR and MT for both languages. This provides a system-wide set of semantic slots that allows new words to be added to the system. The names, special terms and expressions that occur within these classes are the words that are most variable depending on different users' deployments, locations, cultures, customs and tasks, and thus they are in greatest need of user-customization.

In a preferred example, the specific classes used are dependent on the application domain of the system. The classes may include semantic classes for named-entities; person, place and organization names; or task-specific noun phrases; for example: names of foods, illnesses or medicines; and another open class for words or phrases that don't fit into any of the predefined classes. Syntactic classes or word equivalence classes such as synonyms could also be used. Examples of application domains include, but are not limited to, tourist, medical, peace keeping, and the like. In an example, classes required in the tourist application domain include names of persons, cities, foods and the like. In another example, for a medical professional application classes required include names of diseases, medications, anatomical names, and the like. In another example, classes required for a peace-keeping application include names of weapons, vehicles, and the like. To enable field customizable speech translation, the system permits error correction and later learning from these errors through the operation of the correction and repair module 11 in combination with a user field customization module 12.

Correction and Repair Module

Figure 4:
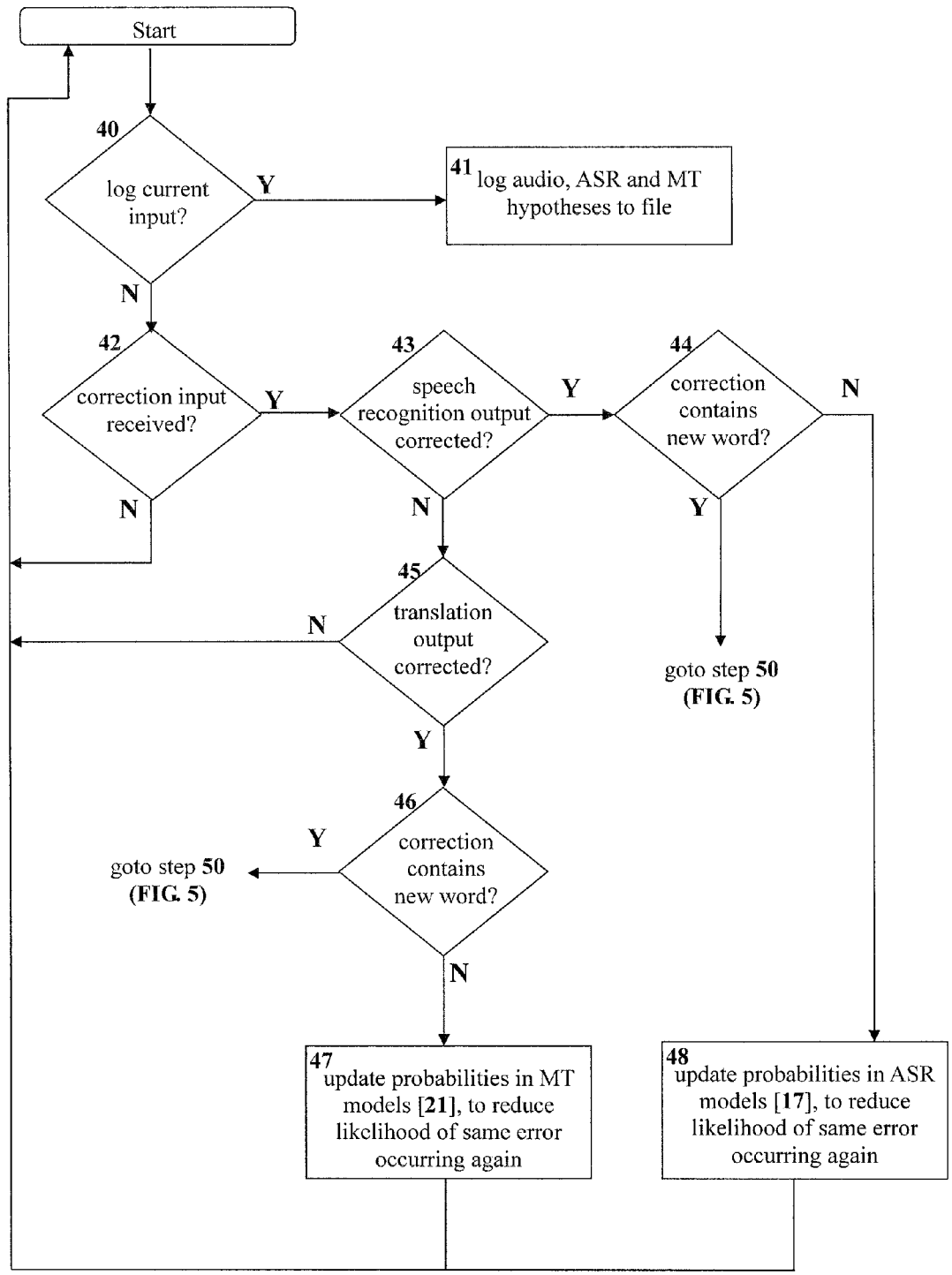
FIG. 4 is a flow chart illustrating the steps by which the system learns from corrections made by the user (Correction and Repair Module)

Correction and repair module 11 enables a user to intervene in the speech-to-speech translation process at any time. The user may either identify and log an error, or, if he/she wishes, correct an error in the speech recognition or translation output. Such user intervention is of considerable value, as it provides immediate correction in the human-human communication process, and opportunities for the system to adjust to user needs and interests and to learn from mistakes. A flow diagram illustrating this error feedback functionality is shown in FIG. 4. If the user is dissatisfied with a translation of an utterance (i.e. an error occurs) the user can log the current input (step 40). The system will save audio of the current utterance as well as other information to a log file. This can be accessed and corrected by the user at a later time, or can be uploaded to a community database to allow expert users to identify and correct errors.

The user can also correct the speech recognition or machine translation output via a number of modalities. The user can correct the entire utterance, by re-speaking it or entering the sentence via a keyboard or handwriting interface. Alternatively a user can highlight an erroneous segment in the output hypothesis via the touch-screen, mouse or cursor keys and correct only that phrase or word, using the keyboard, handwriting, speech, or explicitly spelling out the word letter-for-letter. The user can also select an erroneous segment in the output hypothesis via the touch screen and correct it by selecting a competing hypothesis in an automatically generated drop-down list, or by reentering it by speech, or by any other complementary modality (e.g., handwriting, spelling, paraphrasing, etc.). These methods and how to suitably combine complementary repair actions build on methods proposed by Waibel, et al., in U.S. Pat. No. 5,855,000 for multimodal speech recognition correction and repair. Here they are applied to the speech recognition and translation modules of interactive speech translation systems.

Figure 5:
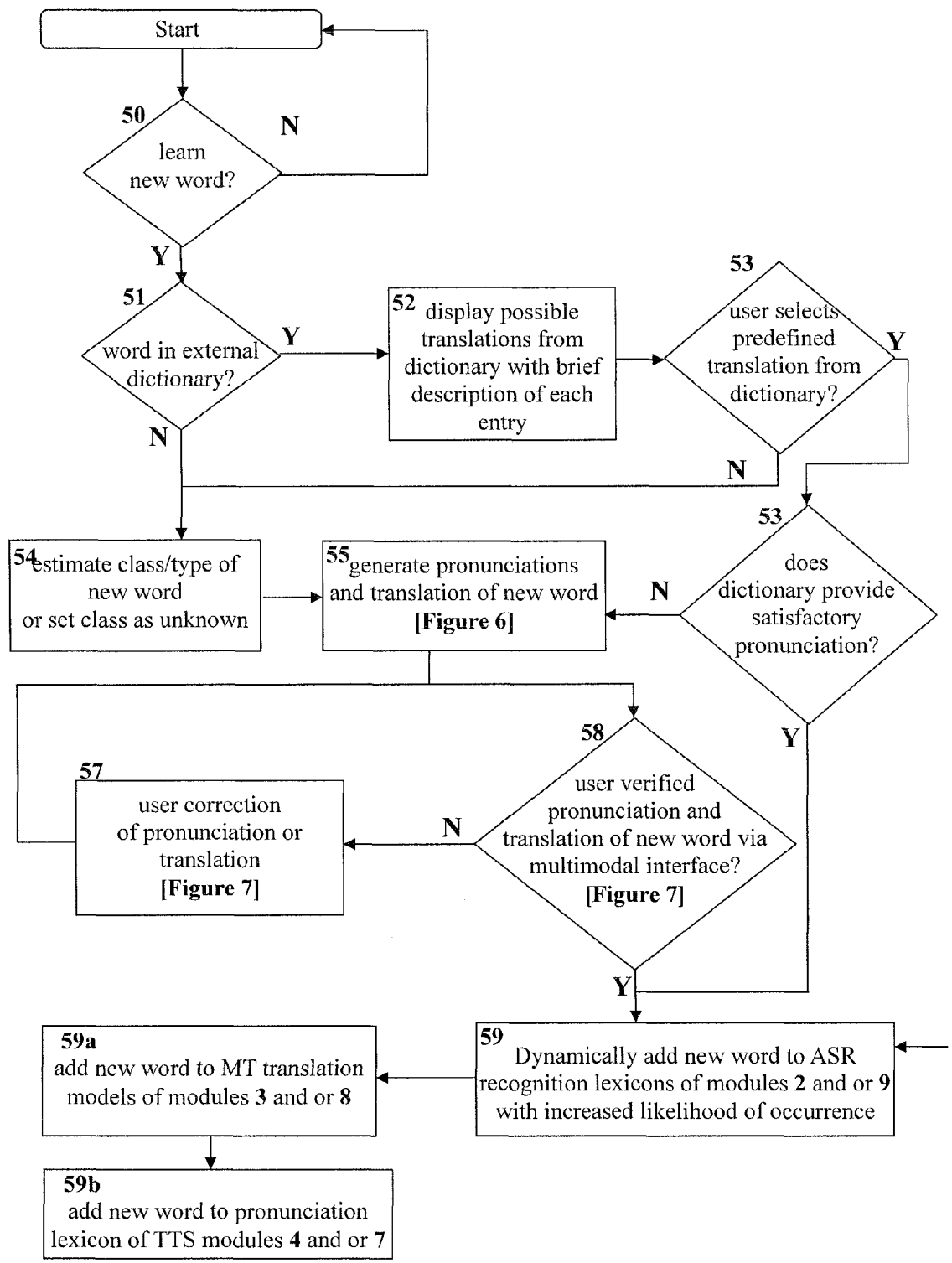
FIG. 5 is a flow chart illustrating the steps by which users can add new words to system (User Field Customization Module)

If the user corrects the speech recognition output (step 43) the system first determines if the correction contains a new word (step 44). This determination is made by checking for the word in the recognition lexicon model 20 associated with each language, $L_a$ and $L_b$. If the word is not found the system prompts the user to add the new word to the active system vocabulary if desired (FIG. 5, step 50). Otherwise, the probabilities in the ASR models (FIG. 3, item 17) are updated to reduce the likelihood of the same error occurring again. This can be performed in a discriminative manner where probabilities of the corrected word sequence are increased, and those of close-competing hypotheses are reduced.

A user can also correct the machine translation output if they have sufficient language expertise. The same modalities as used in the ASR case can be used. If the machine translation output is corrected by the user (step 45) and the correction contains a new word, then the user is prompted with a dialog enabling them to add the new word to the active system vocabulary (FIG. 5, step 50). If the correction only contains words which are already in the active system vocabulary, then the machine translation models (FIG. 3, item 21) are updated. Specifically, an implementation can be used, where phrases are extracted from the corrected sentence pair and these are folded into translation models. The target language model used can be updated in a similar way to the ASR case.

User Field Customization Module

User field customization module 12 enables the system to learn new words in cooperation with the user. Prior systems do not allow users to modify vocabularies in speech-to-speech translation systems. Unlike prior systems, user field customization model 12 enables the user to make incremental modifications in a running system that are relatively easy to perform for a non-expert, with minimal or no knowledge of computer speech and language processing technology or of linguistics. Model 12 offers such field customization by providing and accepting certain easy-to-understand feedback from the user, and based on this feedback deriving all the necessary parameters and system configurations autonomously. Field customization module 12 accomplishes this through: 1) an intuitive interface for user-customization, and 2) internal tools that automatically estimate all the internal parameters and settings needed for user customization, thereby relieving the user from this burden.

For unidirectional translation, the system processes a minimum of four pieces of information about the word or phrase to add a new word or phrase to the active system vocabulary. These include:

class (i.e. semantic or syntactic class of the new entry)
word in language $L_a$ (i.e. written form in $L_a$)
pronunciation of word in $L_a$
translation of word in $L_b$ (i.e. written form in $L_b$)

For a bidirectional translation, the system also requires input of the pronunciation of the new word in $L_b$. The $L_b$ enables the TTS to generate audio output and the ASR module for $L_b$ to recognize the new word in reverse.

A flow chart illustrating the steps of operation of the user field customization model 12 is shown, for example, in FIG. 5. When a new word is encountered by the system, based on a corrective intervention via the correction and repair model 11 in the previous section, it will prompt the user (FIG. 5, step 50) to determine if this word should be "learned", i.e., added to the active system vocabulary. If so, a word learning mode is activated and the field customization module 12 begins to act. Note that field customization or new-word learning need not only result from error correction dialogs. The user may also specifically choose to enter a word learning mode from a pull-down menu, to add a new word or a list of new words a priori. New word learning, could also be triggered by external events that cause a sudden need for different words, such as specialty terms, names, locations, etc. In all such instances, however, the system must collect the above information.

After the user indicates that he/she wishes to add a new word to the system vocabulary (step 50), the system first looks up a large external dictionary, which is either contained locally on the device, or is a dictionary service that can be accessed via the Internet, or is a combination of both. The external dictionary consists of entries of word translation pairs. Each entry contains pronunciation and word-class information which enables the new word to be easily added to the active system vocabulary. Each entry also contains a description of each word-pair in both languages. This will allow the user to select the appropriate translation of the word, even if they have no knowledge of the target language. If the new word is contained within the external dictionary (step 51), the system displays a list of alternative translations of the word with a description of each (step 52). If the user selects one of the predefined translations from the dictionary (step 53), then user can verify the pronunciation and other information provided by the dictionary (step 53*a*), and the edit it if necessary. The new word is then added to the active system vocabulary.

To add a new word to the active system vocabulary, three steps are required (steps 59, 59*a*, 59*b*). First the word and its translation are added to the ASR recognition lexicons of modules 2 and 9 (step 59). The word is added to this recognition lexicon 20 along with the pronunciation(s) given by the dictionary. As the user has just entered this word its probability of occurrence is set to be greater than competing members of the same class within the ASR class-based language model 19. This is to make words that were specifically added by the user more likely. Next, the word and its translation are added to the MT models (FIG. 3, item 21), enabling the system to translate the new-word in both translation directions. Finally, the word is registered with the TTS pronunciation model (FIG. 3, model 33*a*), which enables the system to pronounce the word correctly in both languages.

When the new word entered by the user is not found in the external dictionary, the system will automatically generate the information required to register the word into the active system vocabulary, and will verify this information with the user. First, the class of the new word is estimated via a tagging model (FIG. 3, model 22) using the surrounding word context if it is available (step 54). Next, the pronunciation and translation of the new word are automatically generated via either rule-based or statistical models (step 55). The resulting information is then shown to the user via a multimodal interface (step 58). The system prompts the user to verify (step 58) or correct (step 57) the automatically generated translation or pronunciation. Finally, after the user has verified this information, the new word is added to the active system vocabulary (steps 59, 59*a*, 59*b*). To dynamically add a new word (specifically, "word+pronunciation+word class") to the ASR vocabularies (59), the recognition lexicon 20 (which is typically stored as a tree-structure, within ASR Modules 2 or 9) is searched and then updated to include the new word. This enables the new word to be added to the recognition vocabulary dynamically, and it can thus be recognized, immediately, if spoken in the following utterance. The ASR system does not need to be re-initialized or re-started as in prior systems.

Similarly, a new word (specifically, "word+translation+word class") can be appended to the MT translation model (59*a*), the translation model 23 (which is can be stored as a hash-map within MT modules 3 and/or 8) is searched and an new translation-pair containing the new word its translation, and word class is appended. This enables the new word to be added to the MT modules 3 and/or 8, dynamically, and the new word will be translated correctly in proceeding utterances. The MT systems do not need to be re-initialized or re-started as in prior works.

Estimating all this information automatically is essential, so that a non-expert user in the field can perform the task of customization. In the following, we describe in detail, how this critical information about a word is estimated automatically, and then, how it can be obtained or verified intuitively from the user.

Generation of Pronunciations and Translations of New Words

As users of speech-to-speech translation systems usually have limited or no knowledge of phonetics, linguistics, language technology, and often even have no knowledge of the word and its use in the other language, they cannot be expected to provide a translation and all the pertinent information (pronunciation, orthography, word use, etc.) of each new-word they wish to add to the system. Thus, when the user enters a new-word, the system estimates the word-class and generates the translation and pronunciation information of the word in both languages, automatically.

Figure 6:
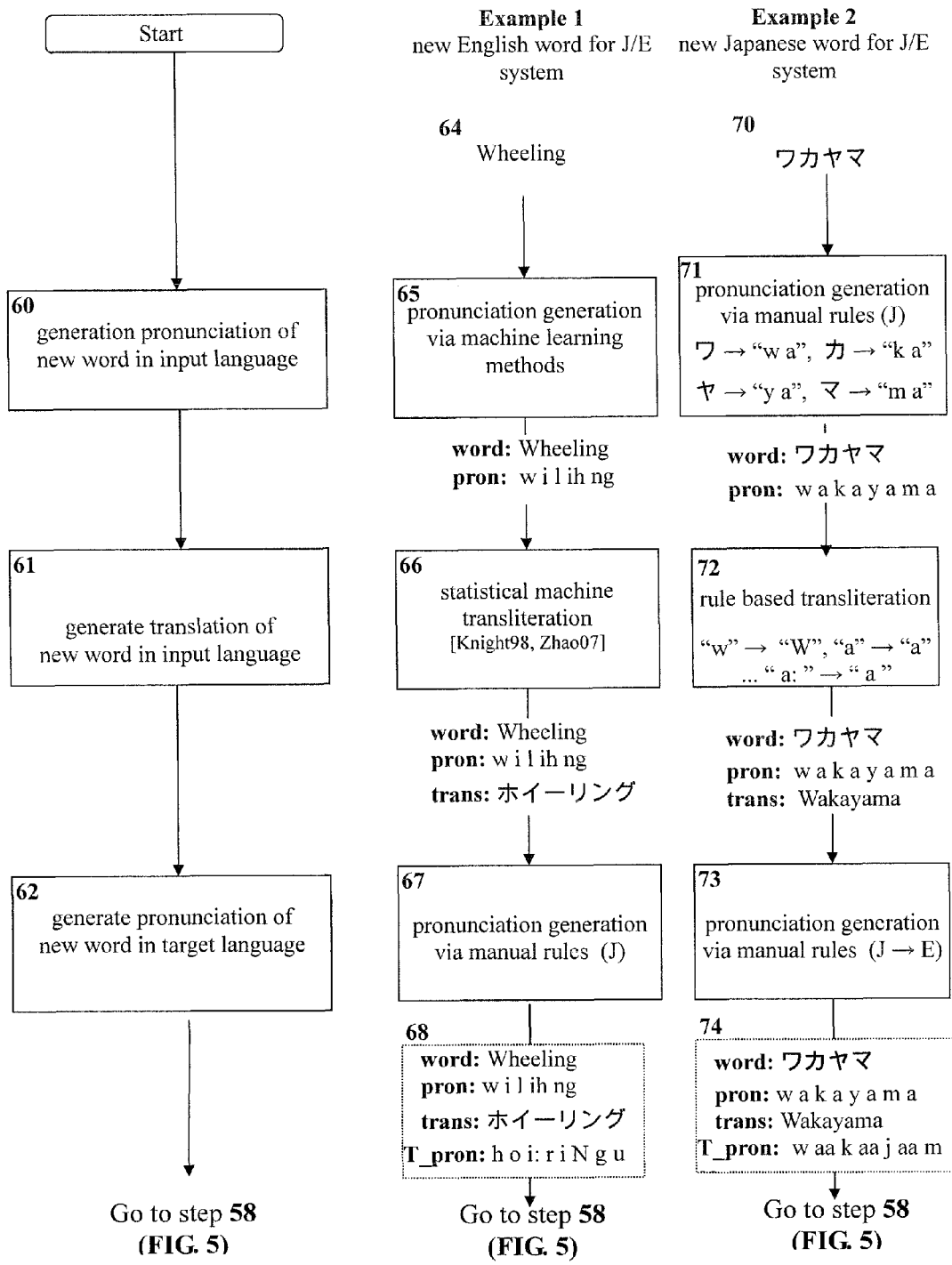
FIG. 6 is a flow chart illustrating one example of methods by which the apparatus automatically generates the translation and pronunciations for new words the user wishes to add to the system.
Figure 7:
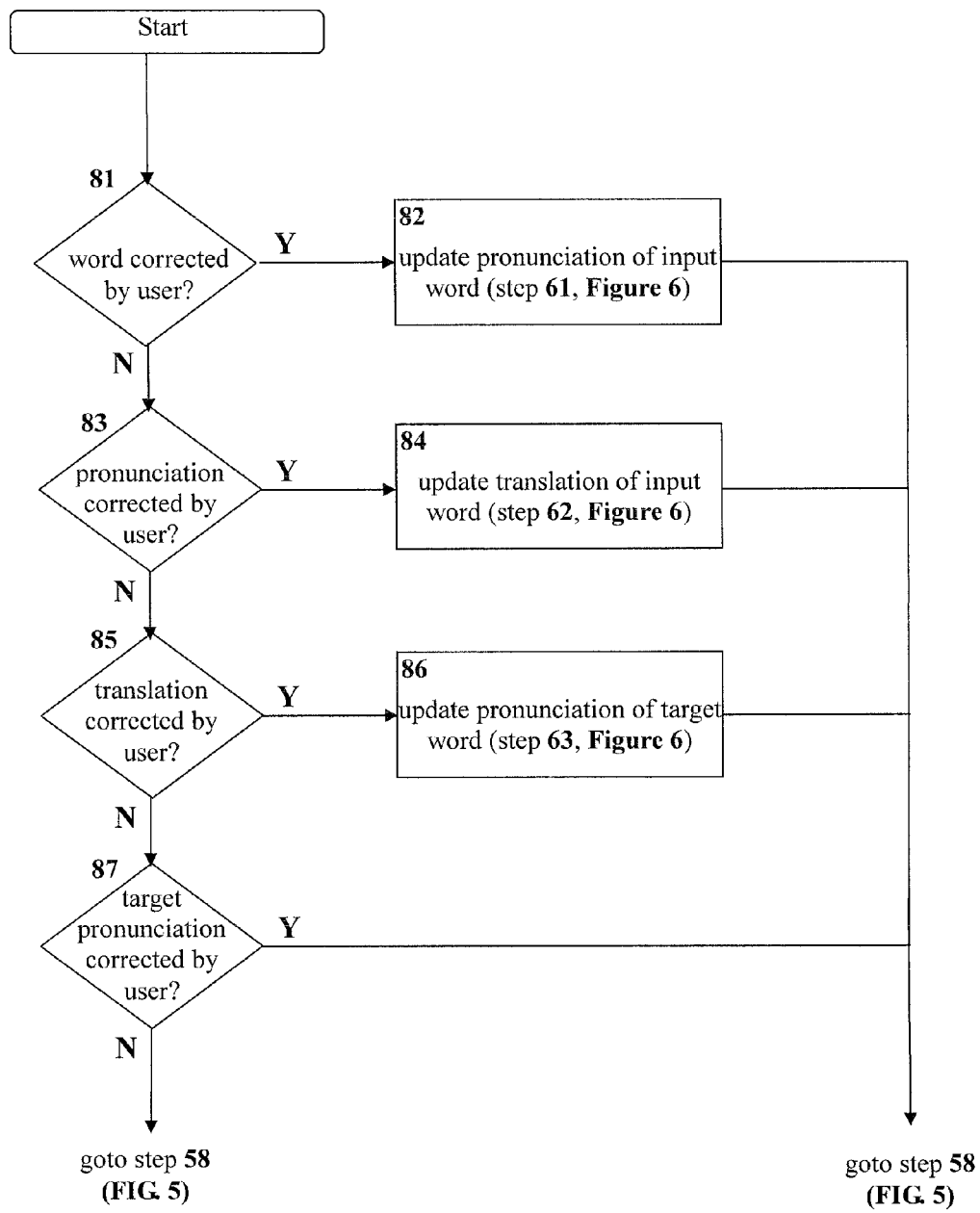
FIG. 7 is a flow chart illustrating one example of a method to verify new word input via a multimodal interface.
Figure 8:
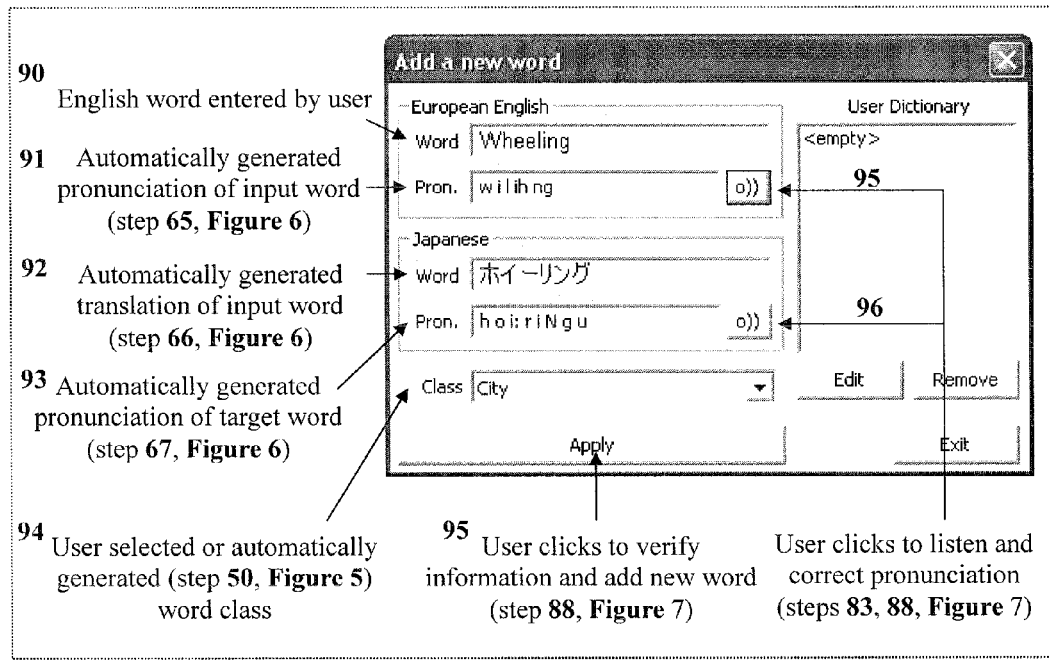
FIG. 8 illustrates an example of a visual interface to display automatically generated word information.
Figure 8:
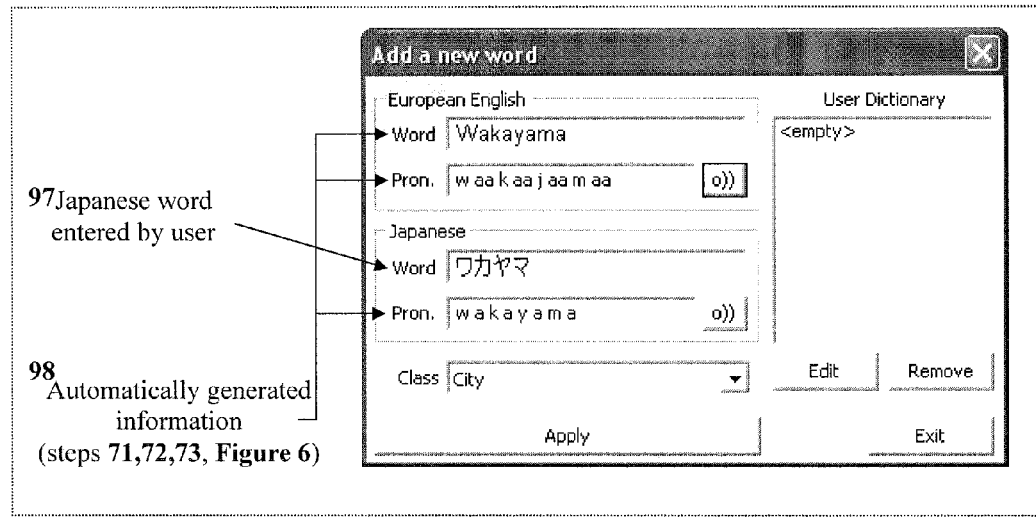
Figure 9:
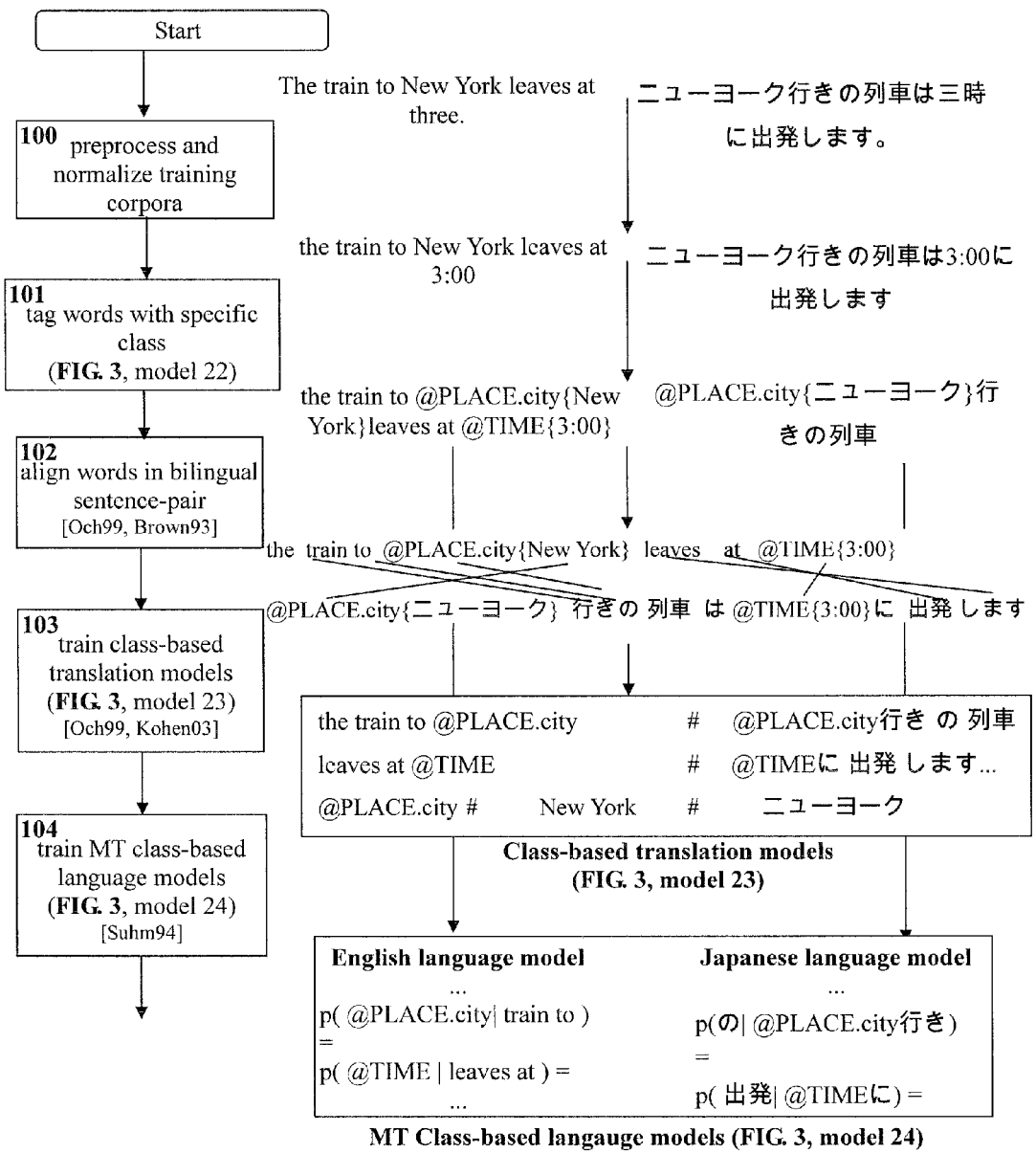
FIG. 9 is a flow chart illustrating the steps required to train class-based MT models.
Figure 10:
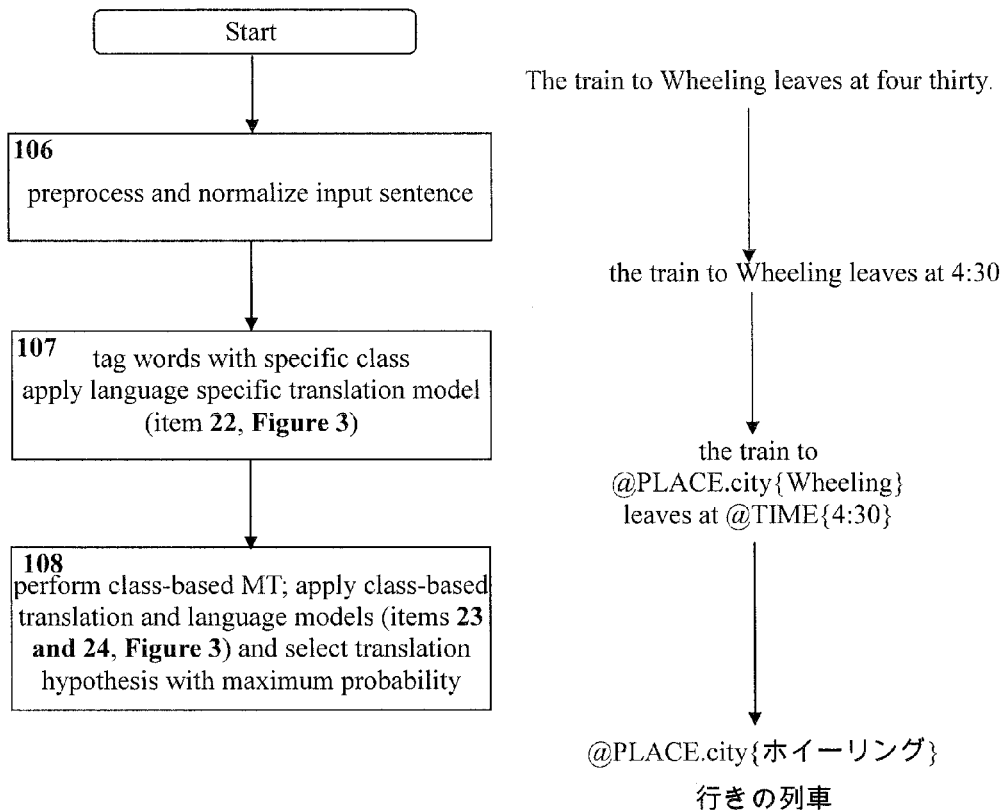
FIG. 10 is a flow chart illustrating the steps of applying class-based MT to an input sentence.

To register a new word into the active system vocabulary, the translation of the word and pronunciations for both the word and its translation are required. Generating this information can be implemented as a three-step process as shown, for example, in FIG. 6. First, the pronunciation of the word is generated (step 60). Based on the character sequence of the word and its pronunciation, a translation is generated (step 61). Next, the pronunciation of the new word in the target language is generated (step 62) using information generated in previous steps. Two examples for generating this information using different techniques within a Japanese-English Field Maintainable S2S Translation System are shown on the left hand side of FIG. 6. To add a new English word "Wheeling" (item 61) to the system, first the English pronunciation is generated via machine learning (step 65). Machine learning may be conducted by any suitable technique such as those described by Damper, R. I. (Ed.), Data-Driven Techniques in Speech Synthesis. Dordrecht, The Netherlands: Kluwer Academic Publishers (2001). Next, the transliteration of this word in Japanese is automatically generated via statistical machine transliteration (step 66), and the Japanese pronunciation is then generated via manually defined rules (step 67). Transliteration may be accomplished by using any suitable statistical machine transliteration engine. Examples include those discussed by K. Knight and J. Graehl, Machine transliteration. Computational Linguistics 24 4 (1998), pp. 599-612; and Bing Zhao, Nguyen Bach, Ian Lane, and Stephan Vogel, "A Log-linear Block Transliteration Model based on Bi-Stream HMMs", to appear in HLT/NAACL-2007. The resulting information (item 68) is then verified by the user by way of acoustic playback and by the phonetic string, before registering the word into the active system vocabulary.

Similarly, to add a new Japanese word "Wakayama" (item 70) to the system, first the Japanese pronunciation is generated via manually defined rules (step 71). Next, the transliteration of this word in Japanese is automatically generated via rule-based transliteration (step 72), the English pronunciation is then generated via manually defined rules (step 73). The rule based transliteration may be performed using methods of Mansur Arbabi, Scott M. Fischthal, Vincent C. Cheng, and Elizabeth Bar, "Algorithms for Arabic name transliteration," IBM Journal of research and Development, 38(2): 183-193, 1994. The resulting information (item 74) is then verified by the user before registering the word into the active system vocabulary.

The user can verify the generated translation and pronunciation via audible output. Alternatively written form may be used if considered more suitable for the user, given their native language (i.e. in "Hanyu Pinyin" for Chinese, or "Romaji" for Japanese if the user is an English speaker). The user may edit the translation and/or pronunciation if required. Once approved by the user, the word and word characteristics are added to the multilingual system dictionary.

The system also eliminates the need for a translation of each new word that is added to the dictionary by automatically generating the required information with the assistance of interactive user input. An example of a user interface is shown in FIG. 3.

Interactive User Interface

Thereafter, the system consults the user to confirm and verify the estimated linguistic information. This is done in an intuitive manner, so as not to presume any special linguistic or technical knowledge. Thus, a suitable interface is used. In the following we describe the user interaction during new word learning.

In the interface, the user may select a "new-word" mode from the menu, or the new word learning mode could be invoked after a user correction has yielded a new/unknown word. In the window pane that appears he/she can now type the desired new word, name, special term, concept, expression. Based on the orthographic input in the user's language (this can be character sets different from English, e.g., Chinese, Japanese, Russian, etc.). The system then generates a transliteration in Roman alphabet and the words predicted pronunciation. This is done by conversion rules that are either hand written or extracted from preexisting phonetic dictionaries or learned from transliterated speech data. The user then views the automatic conversion and can play the sound of the generated pronunciation via TTS. The user may iterate and modify either of these representations (script, Romanized transliteration, phonetic transcription, and its sound in either language) and the other corresponding entries will be regenerated similarly (thus a modified transcription in one language may modify the transcription in the other).

The system further automatically selects the most likely word class that the new word belongs to based on co-occurrence statistics of other words (with known class) in similar sentence contexts. The new word window pane also allows for a manual selection (and/or correction) of this class identity, however, so that the user can override any such estimated class assessment.

In summary, given a new word/phrase from user, the system will

Automatically classify semantic class of entry (used by ASR and MT components)

Automatically generate pronunciation for word (used by ASR and TTS for $L_1$)

Automatically generate translation of word (used by both MT components)

Automatically generate pronunciation of translation (used by ASR and TTS for $L_2$)

Allow user to correct/edit automatically generated data as required

Provide other modalities for user to verify if automatically generated translation is adequate. (i.e. listen to the pronunciation of the word via TTS)

If the user enters a word that does not match any of the pre-defined classes within the system, the user can assign it to the 'unknown' class. For ASR, the 'unknown' class is defined by words that occurred in the training data but not in the recognition lexicon. For SMT bilingual entries that do not occur in the translation lexicon are set to the unknown tag in the target language model.

Intra-Class Probability and Relevance Boosting

Neither of these input methods requires linguistic training and provides an intuitive way for the user to judge if a new word was suitably represented. The user may then accept this new word entry by adding the word to a "multilingual system-dictionary", that is a user's individual lexicon. The overall system merges standardized lexica with customized lexica into the user's runtime dictionary.

In addition to the above five entries, an intra-class probability $P(w|C)$ is also defined. In this fashion it is possible for the system to differentiate between words belonging to the same class. Thus words that are closer to the user's tasks, preferences and habits will be preferred and a higher intra-class probability assigned. This boosting of higher intra-class probability is determined based on relevance to the user, where relevance is assessed by observing:

The new word entry and its recency.

New words entered are naturally more likely to be used in the immediate future, since the user indicated that he/she wanted them by entering them, and thus intra-class probabilities are boosted (increased) over alternate existing class entries Correlation between the new word and user activities, interests and tasks, including Distance for locations such as city names, landmarks, places of interest, etc.

History of past use

Co-occurrence statistics (Sushi correlates better with Tokyo than with Bogota)

General saliency of the new word, including

Population of cities

Recent mention in the Media

Such observations and relevance statistics are collected based on the user's observed location, history or activity, and/or alternatively by observing the occurrence of the system's new word in a large background language resource such as the internet. Such statistics may be collected monolingually, in a data-rich language and applied to the translation dictionary and translation language model.

The relevance of boosted words may also decay over time, as the user's new activities and tasks render such words less likely over time and/or if new information (as the arrival at a different city) make a subclass of words less relevant.

Cross-Modal Entry

Optionally, a new word is entered by one of the following:

Speaking: User speaks the new word. All information such as pronunciations and transliteration is estimated by new word models, translation models, background dictionaries as before but based on the acoustic input. The system may engage in a verbal dialog to select the class identity and other pertaining information.

Spelling: User spells new word acoustically. This input method generally improves the likelihood of a correct transliteration over speaking it. It may also be used complementarily to speaking and other input modalities, Handwriting: User enters new word by handwriting. This input method generally improves the likelihood of a correct transliteration over speaking it. It may also be used complementarily to speaking, spelling, or other input modalities, Browsing: New words may also be selected by interactive browsing. Here the system may propose related, relevant new words by searching the internet for texts with similar statistical profiles as the user's recent usage history and/or recent selected entered new words.

Remote New Word Learning and Shared Lexicon Development Over the Internet

The methods described in the previous sections are all aimed at allowing an individual user to customize a speech translation system to his/her individual needs and tasks in the field. Many of such user customizations could, however, be useful to other users as well. In an embodiment, user customizations are uploaded to a community wide database, where names, special terms, or expressions are shared between interested parties. The vocabulary entries, translations and class tags are collected and related to similarly interested communities. Subsequent users can download these shared community resources and add as resource to their own system.

Alternatively, users may choose to only upload poorly translated sentences, to request manual translation from the community. For such incorrect or incomplete source words or sentences and their missing or incorrect translations other human users can provide online correction and translation on a volunteer (or paid fee) basis. The resulting corrections and translations are once again resubmitted into the updated shared community translation database.

Unsupervised Adaptation

After correction, repair and new word learning, finally, we obtain a corrected hypothesis, and thus a true transcript or translation of a spoken sentence. The speech-to-speech translation device or system automatically can use the fact that such ground truth has been provided to further adapt the ASR modules (FIG. 1, module 2 or 9) to the primary user of the device. Such adaptation is designed to improve the accuracy and usability of the device. Two specific methods of adaptation are performed. First, adaptation of the system to better recognize the user's voice; acoustic model and pronunciation model adaptation, and second, adapting to the user's style of speech by way of language model adaptation. Profiles are used to store adaptation data for specific users and can be switched in the field.

Class-Based Machine Translation

In the previous sections, we have described error repair and new word learning. In these modules, reference was made to class-based machine translation. In the following, we describe the detailed functioning of such class-based machine translation.

The Approach

State of the art machine translation systems perform translation on the word-level. This is evident from prior translation systems including those described in the following three documents; (1) P. Ioehn, H. Hoang, A. Birch, C. Callison-Burch, M. Federico, N. Bertoldi, B. Cowan, W. Shen, C. Moran, R. Zens, C. Dyer, O. Bojar, A. Constantin, and E. Herbst, 'Moses: Open source toolkit for statistical machine translation', In Proc. ACL, 2007 ("[Koehn07"); (2) D. Chiang, A. Lopez, N. Madnani, C. Monz, P. Resnik and M. Subotin, "The Hiero machine translation system: extensions, evaluation, and analysis,", In Proc. Human Language Technology and Empirical Methods in Natural Language Processing, pp. 779-786, 2005 ("Chiang05"); and (3) K. Yamada and K. Knight "A decoder for syntax-based statistical MT". In Proc. Association for Computational Linguistics, 2002 ("Yamada02"). Alignment is performed word-to-word; translation examples, or phrase-pairs are matched at the word level; and word-based language models are applied. Hierarchical translation modules such as those in Chiang05, and syntax-based translation models such as in Yamada02, extend on this by introducing intermediate structure. However, these approaches still require exact word matches. As each word is treated as a separate entity, these models do not generalize to unseen words.

One embodiment of class-based machine translation is class-based statistical machine translation, in which a foreign language sentence $f^J_1 = f_1, f_2, \ldots, f_J$ is translated into another language $e^I_1 = e_1, e_2, \ldots, e_I$ by searching for the hypothesis $\hat{e}^I_1$ with maximum likelihood, given:

$$\hat{e}^I_1 = \text{argmax } P(e^I_1 | f^J_1) = \text{argmax } P(f^J_1 | e^I_1) \cdot P(e^I_1)$$

Classes can be semantic classes, such as named-entities, syntactic classes or classes consisting of equivalent words or word phrases. As an example we describe the case when named-entity classes are incorporated into the system.

The two most informative models applied during translation are the target language model $P(e^I_1)$ and the translation model $P(f^J_1 | e^I_1)$. In a class-based statistical machine translation framework $P(f^J_1 | e^I_1)$ is a class-based translation model (FIG. 3, model 23), and $P(e^I_1)$ is a class-based language model (FIG. 3, model 24).

Class-based models for a statistical machine translation framework can be trained using the procedure shown in FIG.

10. First, the training corpora of sentence pairs are normalized (step 100) and tagging models (FIG. 3, model 22) are used to tag the corpora (step 101). One approach to do this is described in Lafferty01. In this step, sentences that combine to form a training-pair can be tagged independently, tagged jointly, or tags from one language can be projected to the other. After the entire training corpus is tagged, words within sentence-pairs are aligned (step 102). Alignment can be accomplished using current approaches such as those described by Franz Josef Och, Christoph Tillmann, Hermann Ney: "Improved Alignment Models for Statistical Machine Translation"; pp. 20-28; Proc. of the Joint Conf. of Empirical Methods in Natural Language Processing and Very Large Corpora; University of Maryland, College Park, Md., June 1999; and Brown, Peter F., Stephen A. Della Pietra, Vincent J. Della Pietra, and R. L. Mercer. 1993. "The mathematics of statistical machine translation: Parameter estimation," Computational Linguistics, vol 19(2):263-311. In this step, multi-word phrases within a tagged entity (i.e. "New York") are treated as a single token. Next, phrases are extracted (step 103) using methods such as Koehn07 to generate class-based translation models (FIG. 3, model 23). The tagged corpus is also used to train class-based target language models (FIG. 3, model 24). Training may be accomplished using a procedure such as that described in B. Suhm and W. Waibel, "Towards better language models for spontaneous speech' in Proc. ICSLP-1994, 1994 ("Suhm94"). (step 104).

Figure 11:
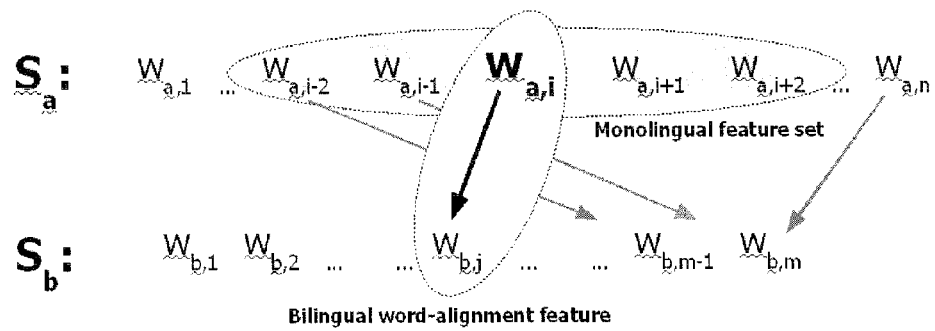
FIG. 11 is a diagram illustrating possible features used during word-class tagging via statistical or machine learning approaches.

To translate an input sentence the method illustrated in FIG. 11 is applied. First, the input sentence is normalized (step 105) and tagged (step 106) using a similar procedure as that applied to the training corpora. The input sentence is tagged using a monolingual tagger (FIG. 3, model 22). Next, the input sentence is decoded using class-based MT models (FIG. 3, models 23 and 24). For class-based statistical machine translation decoding is performed using the same procedure used in standard statistical machine translation, However, phrase-pairs are matched at the class-level, rather than the word, as shown in the example below.

Given the tagged input sentence:
the train to @PLACE.city{Wheeling} leaves at @TIME{4:30}
the following phrases can be matched:

| | | |
|---|---|---|
| train | # | 〇 |
| leaves | # | 〇 |
| @PLACE.city | # | @PLACE.city |
| @TIME | # | @TIME |
| at @TIME | # | @TIME〇 |
| the train to @PLACE.city | # | @PLACE.city〇〇〇 |
| leaves at @TIME | # | 〇@TIME〇〇〇 | word or phrases within a class (i.e.: @PLACE.city{Wheeling}, @TIME{4:30}) are either passed directly through, which is the case for numbers/times, or the translation is determined from the translation model. Users can add new words to the translation model via the "User Field Customization Module" (FIG. 1, module 12). If the user had previously added the city name "Wheeling" (as detailed in the example in FIG. 6), then the translation model will also contain the following phrase:

| | | | | |
|---|---|---|---|---|
| @PLACE.city | # | Wheeling | # | 〇〇〇〇〇〇 |

Search is performed to find the translation hypothesis with maximum likelihood $P(f'_1|e^I_1) \cdot P(e^I_1)$ given the translation model probability $P(f'_1|e^I_1)$ (FIG. 3, model 23) and the MT class-based language model probability $P(e^I_1)$ (FIG. 3, model 24).

Given the above input sentence and phrases the resulting translation will be:
@PLACE.city{〇〇〇〇〇}{〇〇〇〇〇@TIME{4:30}{〇〇〇〇〇
which is a correct translation of the input sentence.

In this example, even though the word "Wheeling" did not appear in the training corpora, after the user has entered the word via the "User Field Customization Module" (FIG. 1, module 12) the system is able to correctly translate the word. Furthermore, as the word-class is known (in this example "@PLACE.city") the system is able to select better translations for surrounding words and will order the words in the translation output correctly.

Parallel Tagging of Multilingual Corpora

In an embodiment, a labeled parallel corpora is obtained by independently tagging each side of the training corpora with monolingual taggers and then removing inconsistent labels from each sentence-pair. In this approach, for each sentence-pair (Sa,Sb) the label-sequence-pair (Ta,Tb) is selected which has maximum conditional probabilities P(Ta,Sa) and P(Tb,Sb). If the occurrence count of any class-tag differs between P(Ta,Sa) and P(Tb,Sb), that class-tag is removed from the label-sequence-pair (Ta,Tb). One method to estimate P(Ta,Sa) and P(Tb,Sb) is by applying conditional random field-based tagging models Lafferty01. An example of a feature set used during monolingual tagging is shown in FIG. 11.

In an embodiment, labeling consistency across sentence-pairs can be further improved by using the target word extracted from word-alignment (wb,j in FIG. 11), in addition to monolingual features.

In another embodiment, both sentences in the translation-pair are jointly labeled while applying the constraint that the class-tag sets must be equivalent. Specifically, for the sentence-pair (Sa,Sb) we search for the label-sequence-pair (Ta, Tb) that maximizes the joint maximum conditional probability $$\lambda a P(Ta,Sa) \cdot \lambda b P(Tb,Sb) \text{ where, } Oi(Ta)=Oi(Tb) \text{ for } 1 \leq i \leq M$$

Oi(Ta) occurrence count of class-tag i in label sequence Ta (number of entities, not word count)
M total number of classes
$\lambda a, \lambda b$ scaling factors
if the performance of the monolingual models differ significantly, $\lambda a$ and $\lambda b$ can be optimized to improve bilingual tagging performance.

In an embodiment, in the case where no manually annotated corpora is available for a specific language, labels can be generated by projecting labels from a first language where labels are known, across the sentence-pairs in the training corpora to the non-annotated language. One approach to do this is described in D. Yarowsky, G. Ngai and R. Wicentowski, "Inducting Multilingual Text Analysis Tools via Robust Projection across Aligned Corpora," In Proc. HLT, pages 161-168, 2001 ("Yarowskyol").

Example System and Evaluation of Class-based Machine Translation

Through experimental evaluation, we show that class-based machine translation, as detailed above, improves translation performance compared to previous approaches. Furthermore, we show that by using the parallel tagging approach described in section 2.2.2, translation accuracy is further improved.

A system for translation between Japanese and English developed for the tourist domain was evaluated. A description of the training and testing data is shown in Table 1.

TABLE 1

Training and Test Data

|  | English | Japanese |
|---|---|---|
| Parallel Training Corpora | | |
| number of sentence-pairs | 400k | |
| number of tokens | 3,257k | 3,171k |
| average sentence length | 8.7 | 8.5 |
| Manually tagged training data (subset of above data) | | |
| training (no. sentence-pairs) | 12600 | |
| held-out Test (no. sentence-pairs) | 1400 | |
| Test set | | |
| number of sentence-pairs | 600 | |
| number of tokens | 4393 | 4669 |
| average sentence length | 7.3 | 7.8 |
| OOV rate | 0.3% | 0.5% |

To realize effective class-based SMT, accurate and consistent tagging across sentence-pairs is vital. We investigated two approaches to improve tagging quality; first, the introduction of bilingual features from word-alignment; and second, bilingual tagging, where both sides of a sentences-pair are jointly tagged. From the parallel training corpora 14,000 sentence-pairs were manually tagged using the 16 class labels indicated in Table 2.

TABLE 2

Classes Used in Evaluation System

| Class | Class labels |
|---|---|
| Number | cardinal, ordinal, sequence, letter |
| Time | time, date, day, month |
| Person | first name, last name |
| Place | city, country, landmark |
| Organization | airline, hotel, company name |

From this manually labeled set, we selected 10% (1400 sentence-pairs) which contained one or more tags as held-out data to evaluate tagging accuracy.

First, the performance of the baseline, monolingual CRF-based taggers was evaluated. Each side of the held-out set was labeled independently, using language dependent models. The output was then compared to the manual reference. The tagging accuracy for various metrics are shown in Table 3.

For the bilingual tagging, a tag is considered correct if the entity is correctly labeled on both sides of the corpora. The right hand column indicates the percentage of sentence-pairs in which both sides were tagged correctly. Although the F-score is above 0.90 for the independent languages, the bilingual tagging accuracy is significantly lower at 0.84, and only 80% of the sentence-pairs were correctly tagged. Incorporating alignment features into the monolingual taggers improved precision for both languages and significantly improvement recall for the Japanese side, however, the percentage of correctly tagged sentence-pairs increased only slightly. Removing inconsistent tags across sentence-pairs improved precision, but the number of correctly tagged sentence-pairs did not improve.

Next, the effectiveness of bilingual tagging was evaluated using the approach described above. The tagging accuracy of this approach, and when word alignment features were incorporated are shown in the lower 2 rows of Table 3. Compared to the monolingual case, bilingual tagging significantly improved tagging accuracy. Not only did tagging consistency improve (the F-score for bilingual tagging increased from 0.84 to 0.95), but the tagging accuracy on both the English and Japanese-sides also improved. Incorporating word-alignment features gained a further small improvement in tagging accuracy for all measures.

The effectiveness of the system was further evaluated by comparing the performance of three class-based systems and a baseline system that did not use class models.

For the baseline system phrase-based translation models were trained using the Moses toolkit such as described in Koehn05 and GIZA++ (such as that used by Franz Josef Och, XHermann Ney. "A Systematic Comparison of Various Statistical Alignment Models", Computational Linguistics, volume 29, number 1, pp. 19-51 Mar. 2003). 3-gram language models were trained using the SRILM toolkit of A. Stolcke "SRILM—an extensible language modeling toolkit", In Proc. of ICSLP, pp. 901-904, 2002. Decoding was performed using our PanDoRA decoder. The decoder is described in Ying Zhang, Stephan Vogel, "PanDoRA: A Large-scale Two-way Statistical Machine Translation System for Hand-held Devices," In the Proceedings of MT Summit XI, Copenhagen, Denmark, Sep. 10-14 2007. Systems were created for both translation directions J→E (Japanese to English) and E→J (English to Japanese) using the training set described in Table 1. The data used to train the target language models were limited to this corpora. The translation quality of the baseline system was evaluated on a test-set of 600 sentences. One reference was used during evaluation. The BLEU-score for the J→E and E→J systems were 0.4381 and 0.3947, respectively. BLEU-score is described in Kishore Papineni, Salim Roukos, Todd Ward and Wei-Jing Zhu "BLEU: a Method for Automatic Evaluation of Machine Translation," In Proc. Association for Computational Linguistics, pp. 311-318, 2002. Translation quality using three different tagging schemes was evaluated:

TABLE 3

Monolingual and Bilingual Tagging Accuracy on Held-Out Training Set

| | English | | | Japanese | | | Bilingual | | | % correctly tagged |
|---|---|---|---|---|---|---|---|---|---|---|
| Tagging Scheme | P | R | F | P | R | F | P | R | F | sentence-pairs |
| monolingual | 0.95 | 0.89 | 0.92 | 0.94 | 0.88 | 0.91 | 0.88 | 0.80 | 0.84 | 80% |
| +alignment features | 0.97 | 0.85 | 0.91 | 0.98 | 0.93 | 0.95 | 0.95 | 0.82 | 0.88 | 82% |
| +remove inconsistent tags | 0.99 | 0.83 | 0.90 | 0.99 | 0.82 | 0.90 | 0.99 | 0.81 | 0.89 | 82% |
| bilingual tagging | 0.98 | 0.92 | 0.95 | 0.98 | 0.92 | 0.95 | 0.97 | 0.90 | 0.93 | 92% |
| +alignment features | 0.98 | 0.93 | 0.96 | 0.98 | 0.93 | 0.96 | 0.98 | 0.92 | 0.95 | 92% |

+num: 8 classes related to numbers, times
+NE-class: above, +8 classes for named-entities
+Bi-Tagging: above 16 classes, training corpora tagged bilingually Monolingual tagging was applied for the +num and +NE-class cases, and tags that were inconsistent across a sentence-pair were removed. In the +Bi-Tagging case, bilingual tagging incorporating word alignment features were used. For each tagging scheme, the entire training corpora was tagged with the appropriate set of class-labels. Class-based translation and language models were then trained using an equivalent procedure to that used in the baseline system. During testing the input sentence was tagged using a monolingual tagger. All named-entities in the test set were entered into the user dictionary to be used during translation.

The performance on the 600 sentence test-set for the baseline and class-based systems are shown in terms of BLEU-score for the J→E and E→J systems in Table 4.

TABLE 4

Translation Quality of Class-based SMT

| System | Translation Quality (BLEU [Papineni02]) | |
|---|---|---|
| | J → E | E → J |
| baseline | 0.4381 | 0.3947 |
| +num | 0.4441 | 0.4104 |
| +NE-class | 0.5014 | 0.4464 |
| +Bi-Tagging | 0.5083 | 0.4542 |

The class-based SMT system using number and time tags (+num), obtained improved translation quality compared to the baseline system for both translation directions. For these models, BLEU-scores of 0.4441 and 0.4104 were obtained. When a class-based system using named-entity classes in addition to number and time tags was applied, translation quality improved significantly. BLEU-scores of 0.5014 for the J→E system and 0.4464 for the E→J case were obtained. When bilingual tagging was used to tag the training corpora (+Bi-Tagging) a further 0.8 point gain in BLEU was obtained for both translation directions. On the 14% of sentences in the test-set which contained one or more named-entities the (+Bi-Tagging) system outperformed the monolingually tagged system ("+NE-class") by up to 3.5 BLEU points.

While the foregoing has been set forth in considerable detail, it is to be understood that the drawings and detailed embodiments are presented for elucidation and not limitation. Design and configuration variations may be made but are within the principles of the invention. Those skilled in the art will realize that such changes or modifications of the invention or combinations of elements, variations, equivalents, or improvements therein are still within the scope of the invention as defined in the appended claims.

What is claimed is:

1. A method for updating the vocabulary of a speech translation system for translating a first language into a second language, the method comprising:
    receiving, by at least one microphone of the speech translation system, an utterance from a user of the speech translation system, wherein the speech translation system is for translating the utterance from the first language into the second language and outputting an audible translation of the utterance in the second language from at least one speaker of the speech translation system;
    after receiving the utterance, receiving, from a user of the speech translation system, via a user interface of the speech translation system, an indication to add a new word in the first language to a first recognition lexicon of the first language of an automatic speech recognition module of the speech translation system, wherein the automatic speech recognition module for the speech translation system comprises the first recognition lexicon, an acoustic model for the first language, and a language model for the first language, and wherein the new word is not contained in the first recognition lexicon, the acoustic module, and the language model of the first language;
    determining, by the speech translation system, word class information, a pronunciation in the first language, and a translation in the second language for the new word;
    adding, by the speech translation system, the new word, along with the word class information and the pronunciation in the first language determined by the speech translation system, to the first recognition lexicon of the first language of the speech translation system;
    adding, by the speech translation system, the new word, along with the word class information and the translation in the second language determined by the speech translation system, to a first machine translation module associated with the first language of the speech translation system, wherein the first machine translation module contains a first tagging module, a first translation model and a first language module, and is configured to translate the new word to a corresponding translated word in the second language.

2. The method of claim 1, wherein the adding of the new word to the first recognition lexicon of the first language and adding the new word to the machine translation module are performed without re-initializing or re-starting the automatic speech recognition module.

3. The method of claim 1, wherein updating the new word in the first machine translation module is performed without re-initializing or re-starting the machine translation module.

4. The method of claim 1, additionally comprising the steps of:
    translating, by a second machine translation module associated with the second language of the speech translation system, the corresponding translated word from the second language back into the new word of the first language,
    correlating the new word in the first language with the corresponding translated word of the second language and adding the corresponding translated word and its word class information to a second recognition lexicon of the second language; and
    updating the second machine translation module with the corresponding translated word and the word class information, wherein the second machine translation module contains a second tagging module, a second translation model and a second language module.

5. The method of claim 1, further comprising:
    inputting the corresponding translated word into a text-to-speech pronunciation lexicon associated with the second language.

6. The method of claim 4, comprising the further step of inputting the new word into a text-to-speech pronunciation lexicon associated with the first language.

7. The method of claim 4, wherein the adding of the translated word to the second recognition lexicon further comprises increasing a relative word probability of the new word within a class of a class-based language model associated with the second language.

8. The method of claim 1, further comprising:
translating the new word of the first language into the corresponding translated word of the second language and one or more other languages,
correlating the new word with a corresponding third or more words of the one or more other languages, respectively,
adding the third or more words of one or more other languages to a recognition lexicon associated with each of the one or more other languages of the speech translation system; and
updating machine translation modules associated with the one or more other languages, wherein the machine translation modules each contain respectively a tagging module, a translation model and a language module.

9. The method of claim 1, further comprising:
recognizing, by the speech translation system, the new word in the received utterance from the user using confidence measures and new word models; and
prompting the user, via the user interface of the speech translation system, to add the new word.

10. The method of claim 1, wherein the adding of the new word to the first recognition lexicon of the first language further comprises increasing a relative word probability of the new word within a class of a class-based language model associated with the first language.

11. The method of claim 10, wherein the increasing of the relative word probability of the new word associated with the first language is performed outside known classes by associating it with an unknown class and increasing its probability within the class of unknown words.

12. The method of claim 10, wherein the adding of the new word to the translation lexicon of the first language further comprises increasing the translation probability of the new word and its translation thereby improving the likelihood to subsequently translate the new word more appropriately for the user.

13. The method of claim 1, wherein associating the word class information includes accepting word class information provided by the user.

14. The method of claim 1, wherein associating the word class information includes selecting one or more possible descriptions from a dictionary associated with the speech translation system and displaying the one or more possible descriptions for user acceptance.

15. The method of claim 1, wherein associating the word class information includes automatically generating a hypothesis using a user field customization module of the speech translation system.

16. The method of claim 15, wherein the generation is learned from transliterated speech data.

17. The method of claim 15, further comprising selecting, by the speech translation system, a most likely word class for the new word based on co-occurrence statistics of other words having a known class that are similar.

18. The method of claim 1, wherein:
after determining the pronunciation and the translation for the new word, the user interface of the speech translation system prompts the user for verification of the pronunciation and the translation for the new word; and
upon receiving verification from the user of the pronunciation and the translation for the new word:
adding the new, along with the word class information and the pronunciation in the first language determined by the speech translation system, to the first recognition lexicon of the first language of the speech translation system; and
adding the new word, along with the word class information and the translation in the second language determined by the speech translation system, to the first machine translation module associated with the first language of the speech translation system.

19. The method of claim 18, wherein the speech translation system determines the word class information, pronunciation and translation for the new word without prompting the user for an input that requires expertise in computer speech and language processing technologies.

20. The method of claim 1, wherein the speech translation system determines the word class information using the first tagging module.

21. The method of claim 20, wherein the speech translation system determines the word class information based on a surrounding context for the new word.

22. The method of claim 1, wherein determining the pronunciation of the new word in the first language comprises determining the pronunciation of the new word in the first language by machine learning.

23. The method of claim 22, wherein determining the translation of the new word in the second language comprises determining the translation of the new word in the second language by statistical machine transliteration based on the pronunciation of the new word in the first language.

24. The method of claim 23, further comprising determining by the speech translation system a pronunciation for the new word in the second language based on the translation of the new word in the second language.

25. A field maintainable class-based translation apparatus comprising:
at least one microphone for receiving an audible utterance in a first language from a user of the apparatus;
an automatic speech recognition module for the first language in communication with the at least one microphone, wherein the automatic speech recognition module comprises a recognition lexicon for the first language, an acoustic model for the first language, and a language model for the first language;
a machine translation module in communication with the automatic speech recognition module for translating output from the automatic speech recognition module in the first language into a second language;
a user interface for the user to input an indication to add a new word to the recognition lexicon of the automatic speech recognition module for the first language, and
a correction and repair module for determining word class information, a pronunciation in the first language, and a translation in the second language for the new word;
wherein, when the new word is not contained in the recognition lexicon of the first language and is not contained in the language model of the first language, the new word, along with the word class information and the pronunciation in the first language determined by the correction and repair module are added to the recognition lexicon for the first language; and
wherein the new word, along with the word class information and the translation in the second language determined by the correction and repair module are added to the machine translation module such that the machine translation module translates the new word to a corresponding translated word in the second language.

26. The apparatus of claim 25 further comprising a second machine translation module associated with the second language for translating a second new word in the second language with a second translated word in the first language.

27. The apparatus of claim 25, wherein the user interface accepts orthographic input in the user's language.

28. The apparatus of claim 25 wherein the language model of the first language is updated with at least one update based upon a correction to an error made to a speech recognition hypothesis, wherein the at least one update includes updating the probabilities in the language model for the first language of the automatic speech recognition module to reduce the likelihood of the same error occurring by increasing the language model probabilities of the corrected word sequence and reducing the language model probabilities of close-competing hypotheses.

29. The apparatus of claim 25, further comprising:
an automatic speech recognition module for the second language in communication with at least one microphone for recognizing utterances in the second language received by at least one microphone, wherein the automatic speech recognition module comprises a recognition lexicon for the second language, an acoustic model for the second language, and a language model for the second language;
a machine translation module in communication with the automatic speech recognition module for translating output from the automatic speech recognition in the second language into the first language;
a second text-to-speech module in communication with machine translation module for the second language for the generating an audible translation of the utterance in the first language.

30. The apparatus of claim 25, further comprising a text-to-speech module in communication with the machine translation module for the generating an audible translation of the utterance in the second language.

31. The apparatus of claim 30, further comprising at least one speaker, in communication with the text-to-speech module, for outputting the audible translation of the utterance in the second language.

* * * * *